(12) United States Patent
Chang

(10) Patent No.: US 10,528,388 B1
(45) Date of Patent: Jan. 7, 2020

(54) DATA FLOW CONTROL IN A PARALLEL PROCESSING SYSTEM

(71) Applicant: X-Drive Technology, Inc., San Jose, CA (US)

(72) Inventor: Darder Chang, San Jose, CA (US)

(73) Assignee: X-Drive Technology, Inc., San Jose, CA (US)

( * ) Notice: Subject to any disclaimer, the term of this patent is extended or adjusted under 35 U.S.C. 154(b) by 0 days.

(21) Appl. No.: 16/135,623

(22) Filed: Sep. 19, 2018

Related U.S. Application Data

(63) Continuation-in-part of application No. 16/033,100, filed on Jul. 11, 2018.

(51) Int. Cl.
*G06F 9/48* (2006.01)

(52) U.S. Cl.
CPC .................. *G06F 9/4881* (2013.01)

(58) Field of Classification Search
CPC .................................................... G06F 9/4881
See application file for complete search history.

(56) References Cited

U.S. PATENT DOCUMENTS

| | | | |
|---|---|---|---|
| 9,898,341 B2 | 2/2018 | Chang et al. | |
| 2003/0058802 A1* | 3/2003 | Jones | H04L 47/10 370/252 |
| 2010/0315948 A1* | 12/2010 | Yi | H04L 47/10 370/235 |

* cited by examiner

*Primary Examiner* — Charlie Sun
(74) *Attorney, Agent, or Firm* — Thomas C. Chan; Silicon Valley Patent Group LLP

(57) ABSTRACT

Method and system are disclosed for data flow control in a parallel processing system. The method includes storing tasks to be serviced in a plurality of task queues based on assigned priorities of the tasks, where a task queue in the plurality of task queue stores tasks having assigned priorities in a given priority range, determining a usage rate associated with the each task queue in the plurality of task queues, determining a dynamic access rate corresponding to the each task queue based on the assigned priority level and the usage rate associated with the each task queue in the plurality of task queues, traversing the plurality of task queues in order, and selecting a task queue from the plurality of task queues for service based on the dynamic access rate associated with the task queue.

16 Claims, 22 Drawing Sheets

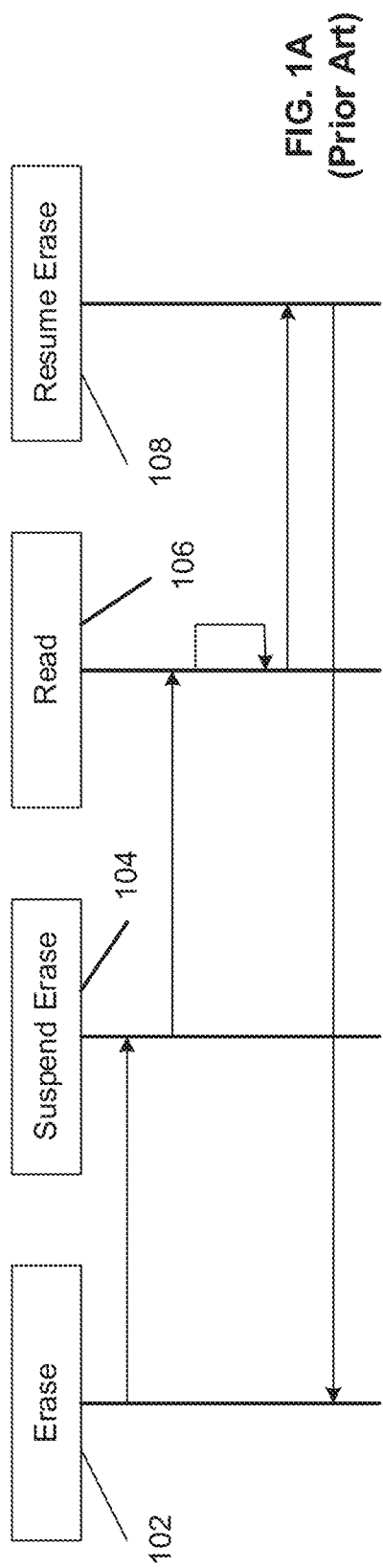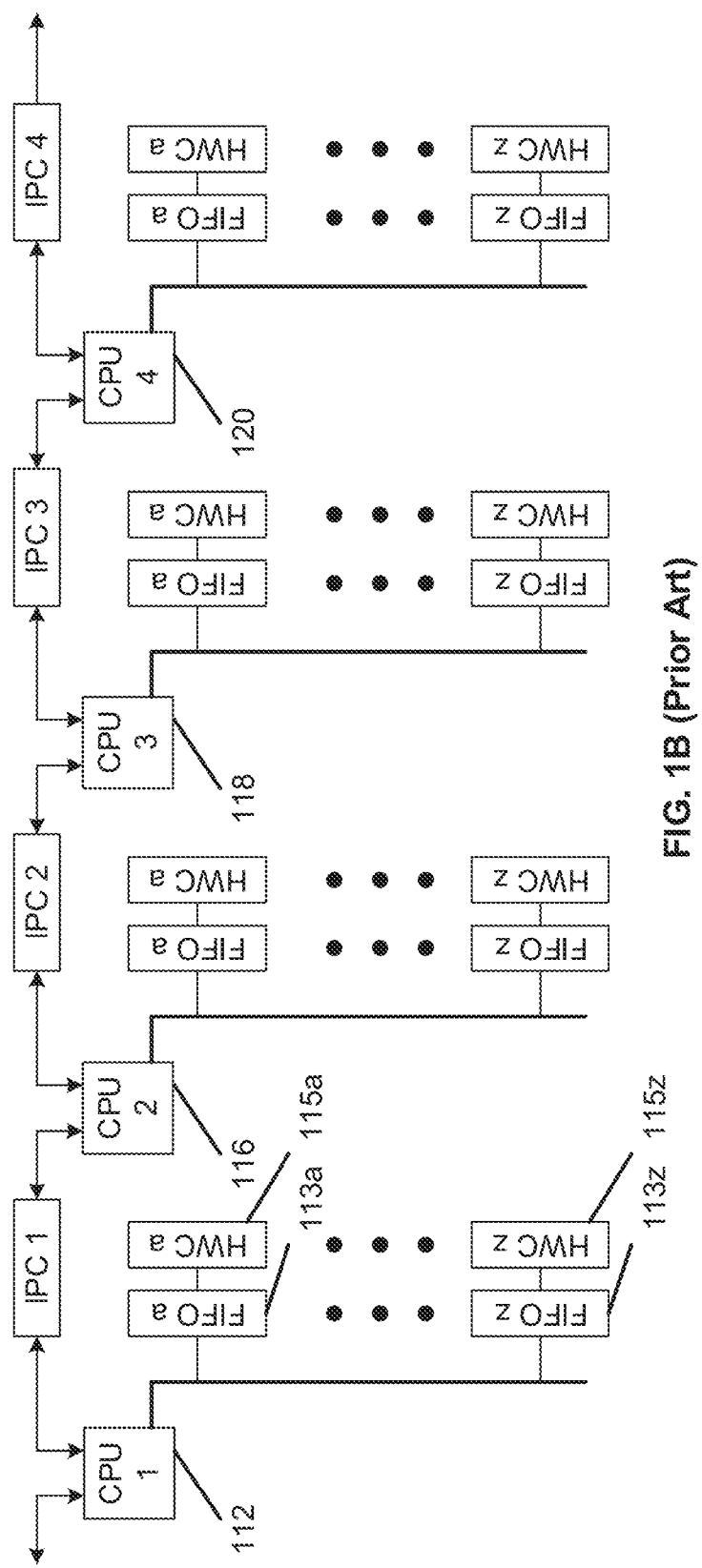

| Dynamic Access Rate \ Bits | 7 | 6 | 5 | 4 | 3 | 2 | 1 | 0 |
|---|---|---|---|---|---|---|---|---|
| 0% | 0 | 0 | 0 | 0 | 0 | 0 | 0 | 0 |
| 0.1% - 12.5% | 0 | 0 | 0 | 0 | 0 | 0 | 0 | 1 |
| 12.6% - 25% | 0 | 0 | 0 | 0 | 0 | 0 | 1 | 1 |
| 25.1% - 37.5% | 0 | 0 | 0 | 0 | 0 | 1 | 1 | 1 |
| 37.6% - 50% | 0 | 0 | 0 | 0 | 1 | 1 | 1 | 1 |
| 50.1% - 62.5% | 0 | 0 | 0 | 1 | 1 | 1 | 1 | 1 |
| 62.6% - 75% | 0 | 0 | 1 | 1 | 1 | 1 | 1 | 1 |
| 75.1% - 87.5% | 0 | 1 | 1 | 1 | 1 | 1 | 1 | 1 |
| 87.6% - 100% | 1 | 1 | 1 | 1 | 1 | 1 | 1 | 1 |

FIG. 9A

| Dynamic Access Rate \ Bits | 4 | 3 | 6 | 1 | 5 | 2 | 7 | 0 |
|---|---|---|---|---|---|---|---|---|
| 0% | 0 | 0 | 0 | 0 | 0 | 0 | 0 | 0 |
| 0.1% - 12.5% | 0 | 0 | 0 | 0 | 0 | 0 | 0 | 0 |
| 12.6% - 25% | 0 | 0 | 0 | 0 | 0 | 0 | 0 | 1 |
| 25.1% - 37.5% | 0 | 0 | 0 | 1 | 0 | 1 | 0 | 1 |
| 37.6% - 50% | 0 | 1 | 0 | 1 | 0 | 1 | 0 | 1 |
| 50.1% - 62.5% | 1 | 1 | 0 | 1 | 0 | 1 | 0 | 1 |
| 62.6% - 75% | 1 | 1 | 1 | 1 | 1 | 1 | 0 | 1 |
| 75.1% - 87.5% | 1 | 1 | 1 | 1 | 1 | 1 | 0 | 1 |
| 87.6% - 100% | 1 | 1 | 1 | 1 | 1 | 1 | 1 | 1 |

Shuffled Bit Order

FIG. 9B

| Dynamic Access Rate \ Bits | 7 | 6 | 5 | 4 | 3 | 2 | 1 | 0 |
|---|---|---|---|---|---|---|---|---|
| 25.1% - 37.5% | 0 | 0 | 0 | 0 | 0 | 1 | 1 | 1 |
| 37.6% - 50% | 0 | 0 | 0 | 0 | 1 | 1 | 1 | 1 |

FIG. 11A

| Dynamic Access Rate \ Bits | 7 | 6 | 5 | 4 | 3 | 2 | 1 | 0 |
|---|---|---|---|---|---|---|---|---|
| 25.1% - 37.5% | 0 | 0 | 0 | 0 | 0 | 1 | 1 | 1 |
| 50.1% - 62.5% | 0 | 0 | 0 | 1 | 1 | 1 | 1 | 1 |

FIG. 11B

| Dynamic Access Rate \ Bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0% | 0 | 0 | 0 | 0 | 0 | 0 | 0 | 0 | 0 | 0 | 0 | 0 | 0 | 0 | 0 | 0 |
| 0.1% - 6.25% | 0 | 0 | 0 | 0 | 0 | 0 | 0 | 0 | 0 | 0 | 0 | 0 | 0 | 0 | 0 | 1 |
| 6.26% - 12.5% | 0 | 0 | 0 | 0 | 0 | 0 | 0 | 0 | 0 | 0 | 0 | 0 | 0 | 0 | 1 | 1 |
| 12.51% - 18.75% | 0 | 0 | 0 | 0 | 0 | 0 | 0 | 0 | 0 | 0 | 0 | 0 | 0 | 1 | 1 | 1 |
| 18.76% - 25% | 0 | 0 | 0 | 0 | 0 | 0 | 0 | 0 | 0 | 0 | 0 | 0 | 1 | 1 | 1 | 1 |
| 25.01% - 31.25% | 0 | 0 | 0 | 0 | 0 | 0 | 0 | 0 | 0 | 0 | 0 | 1 | 1 | 1 | 1 | 1 |
| 31.26% - 37.5% | 0 | 0 | 0 | 0 | 0 | 0 | 0 | 0 | 0 | 0 | 1 | 1 | 1 | 1 | 1 | 1 |
| 37.51% - 43.75% | 0 | 0 | 0 | 0 | 0 | 0 | 0 | 0 | 0 | 1 | 1 | 1 | 1 | 1 | 1 | 1 |
| 43.76% - 50% | 0 | 0 | 0 | 0 | 0 | 0 | 0 | 0 | 1 | 1 | 1 | 1 | 1 | 1 | 1 | 1 |

FIG. 11D

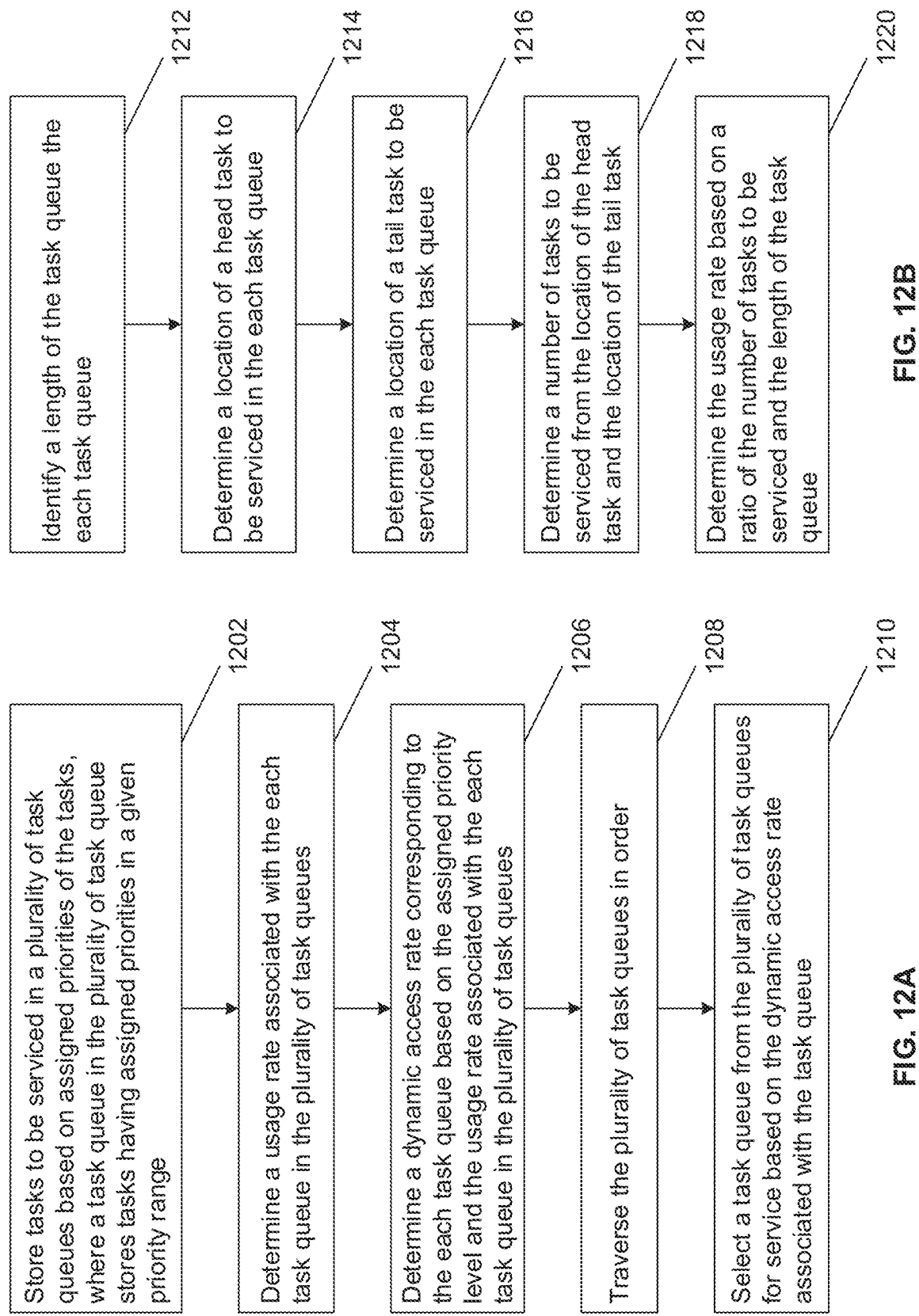

DATA FLOW CONTROL IN A PARALLEL PROCESSING SYSTEM

CROSS-REFERENCE TO RELATED APPLICATIONS

The present application is a continuation-in-part of non-provisional U.S. application Ser. No. 16/033,100, entitled "Programmable State Machine Controller in a Parallel Processing System," filed Jul. 11, 2018. The aforementioned United States application is hereby incorporated by reference in its entireties.

FIELD OF THE INVENTION

The present invention relates to the field of data access in data center applications. In particular, the present invention relates to data flow control in a parallel processing system.

BACKGROUND

FIG. 1A illustrates a conventional software state machine in a parallel processing system. As shown in FIG. 1A, the conventional software state machine may include four states, namely erase 102, suspend erase 104, read 106, and resume erase 108. The software state machine transitions from one state to another state upon certain state transition conditions are met. For example upon observing a first set of transition conditions, the software state machine may transition from erase 102 to suspend erase 104. Similarly, upon observing a second set of transition conditions, the software state machine may transition from suspend erase 104 to read 106. At the state read 106, the software state machine may stay in this state to execute a series of reads, and until the series of reads are completed (which can be a third set of transition conditions), then the software state machine may transition from read 106 to resume erase 108. In state resume erase 108, upon observing a fourth set of transition conditions, the software state machine may return to the state erase 102.

FIG. 1B illustrates an implementation of the conventional software state machine of FIG. 1A in a parallel processing system. In the approach shown in FIG. 1B, a CPU and its associated components are dedicated to implement each software state of FIG. 1A. In this example, CPU1 112 and its associated components can be dedicated to implement the function (i.e. software state) erase 102; CPU2 116 and its associated components can be dedicated to implement the function (i.e. software state) suspend erase 104; CPU3 118 and its associated components can be dedicated to implement the function (i.e. software state) read 106; and CPU4 120 and its associated components can be dedicated to implement the function (i.e. software state) resume erase 108; and so on. The associated components of a CPU, such as CPU1 112, may include a plurality of first-in-first-out random access memories or registers (shown as 113a to 113z) and a plurality of hardware components (shown as 115a to 115z). In addition, the CPUs are communicated with each other through inter-processor communication (IPC) units, such as IPC1, IPC2, IPC3, and IPC4.

There are at least two drawbacks associated with the software state machine shown in FIG. 1A and FIG. 1B. First, although CPUs may operate independent of each other, however, the inter-processor communications among the CPUs, typically through software interrupts, adds inefficiencies to the system and thus adversely impacts the performance of the system. As the number of CPUs increase in the system, the performance benefit of the additional CPUs are less significant as the performance benefits of the additional CPUs are lost in the inefficiencies of inter-processor communications. Second, since each CPU in the software state machine of FIG. 1B is dedicated to implement a particular function, when one CPU is performing a particular function, such as an erase operation or a read operation, the other CPUs are typically idle, which may further introduce inefficiencies to the system.

FIG. 1C illustrates a conventional hardware state machine. Similar to FIG. 1A, the hardware state machine includes states erase 102, suspend erase 104, read 106, and resume read 108. In the conventional hardware state machine shown in FIG. 1C, the hardware states and the transitions among the hardware states are typically implemented with application specific hardware or dedicated CPUs and their associated components. There are at least two drawbacks with the conventional hardware state machine. First, since the implementation of the hardware states and the transitions among the hardware states are fixed in application specific hardware or dedicated CPUs and their associated components, if there is a mistake in the implementation, the entire system needs to be manufactured to include the fixes, which can be extremely costly and may cause months of delay to the development of the system. Second, since the implementation of the hardware states and the transitions among the hardware states are fixed in application specific hardware or dedicated CPUs and their associated components, this implementation prevents the option of adding another state to the hardware state machine, in the event when there is a need to add a new function to the system or to temporarily add a new state to the system for debugging purposes.

FIG. 7 illustrates a conventional arbitration scheme in a parallel processing system. As shown in FIG. 7, the parallel processing system includes a plurality of task queues labeled as 702, 704, to 706. Each task queue may include tasks having priorities in certain priority range. For example, task queue 702 includes tasks having priorities in range A; task queue 704 includes tasks having priorities in range B; and task queue 706 includes tasks having priorities in range C. One arbitration scheme is round-robin, where the arbitrator/controller 708 visits all tasks queues one at a time in sequence, taking a task from the visited task queue for it to access data 710. One drawback with this scheme is that the task queues having high priorities would be visited at the same frequency as the task queues having low priorities, which may adversely impact users' experience of the parallel processing system. Another arbitration scheme is to arbitrate based on the priorities of the task queues. For example, tasks in task queue 702 that have priorities in range A would be served first before tasks in task queue 706 that have priorities in range C (assuming priorities in range A is higher than priorities in range C). In this case, tasks having higher priorities would be serve first, while tasks having lower priorities would have to wait until other higher priority tasks have been served. A drawback with this scheme is that it would lead to pile up of lower priority tasks or there would be an excessive long period of wait time for some of the lower priority tasks, which leads to processors that handles the lower priority tasks being idle, and which in turn compromises the performance of the system.

Therefore, there is a need for methods and systems that address the issues of the conventional arbitration scheme described above. Specifically, there is a need for data flow control in a parallel processing system.

SUMMARY

Methods and systems are disclosed for data flow control in a parallel processing system. In one embodiment, a method for data flow control in a parallel processing system includes storing tasks to be serviced in a plurality of task queues based on assigned priorities of the tasks, where a task queue in the plurality of task queue stores tasks having assigned priorities in a given priority range, determining a usage rate associated with the each task queue in the plurality of task queues, determining a dynamic access rate corresponding to the each task queue based on the assigned priority level and the usage rate associated with the each task queue in the plurality of task queues, traversing the plurality of task queues in order, and selecting a task queue from the plurality of task queues for service based on the dynamic access rate associated with the task queue.

In another embodiment, a data flow controller in a parallel processing system includes a plurality of task queues configured to store tasks to be serviced based on assigned priorities of the tasks, where a task queue in the plurality of task queue stores tasks having assigned priorities in a given priority range, and the plurality of task queues are implemented in a computer memory. The data flow controller further includes one or more processors configured to: determine a usage rate associated with the each task queue in the plurality of task queues, determine a dynamic access rate corresponding to the each task queue based on the assigned priority level and the usage rate associated with the each task queue in the plurality of task queues, traverse the plurality of task queues in order, and select a task queue from the plurality of task queues for service based on the dynamic access rate associated with the task queue.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 1A illustrates a conventional software state machine in a parallel processing system.

FIG. 1B illustrates an implementation of the conventional software state machine of FIG. 1A in a parallel processing system.

FIG. 9A illustrates an exemplary representation of dynamic access rate according to aspects of the present disclosure.

FIG. 9B illustrates an exemplary implementation of shuffling bits representing a dynamic access rate according to aspects of the present disclosure.

FIG. 10 B illustrates an exemplary implementation of traversing a plurality of task queues with corresponding dynamic access rates according to aspects of the present disclosure.

FIG. 11A illustrates an exemplary implementation of modifying a dynamic access rate according to aspects of the present disclosure.

FIG. 11B illustrates another exemplary implementation of modifying a dynamic access rate according to aspects of the present disclosure.

FIG. 11D illustrates yet another exemplary implementation of modifying a dynamic access rate according to aspects of the present disclosure.

FIG. 12A illustrates a method of performing data flow control in a parallel processing system according to aspects of the present disclosure.

FIG. 12B illustrates a method of determining a usage rate associated with a task queue according to aspects of the present disclosure.

DESCRIPTION OF EMBODIMENTS

Methods and systems are disclosed for data flow control in a parallel processing system. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 2A:
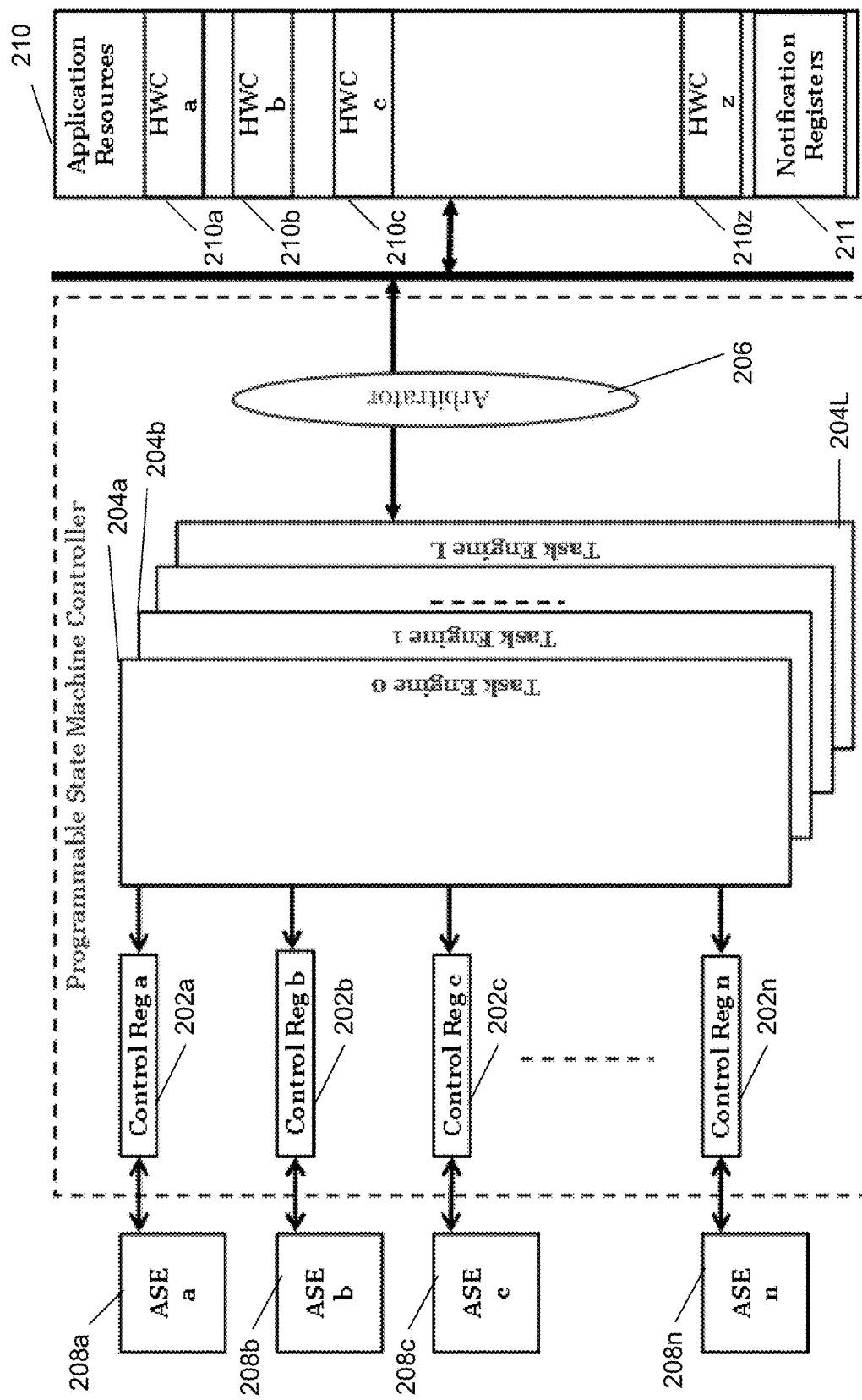
FIG. 2A illustrates an exemplary implementation of a programmable state machine controller in a parallel processing system according to aspects of the present disclosure.

FIG. 2A illustrates an exemplary implementation of a programmable state machine controller in a parallel processing system according to aspects of the present disclosure. In the example shown in FIG. 2A, the programmable state machine controller 200 includes a plurality of control registers, namely control register a through control register n (labelled as 202a, 202b, 202c through 202n); a set of task engines, namely task engine 0 through task engine L (labelled as 204a, 204b through 204L); and arbitrator 206. The content of the plurality of control registers are programmable by the programmable state machine controller to enable each of the control register to perform certain function of a state in a state machine.

Figure 1C:
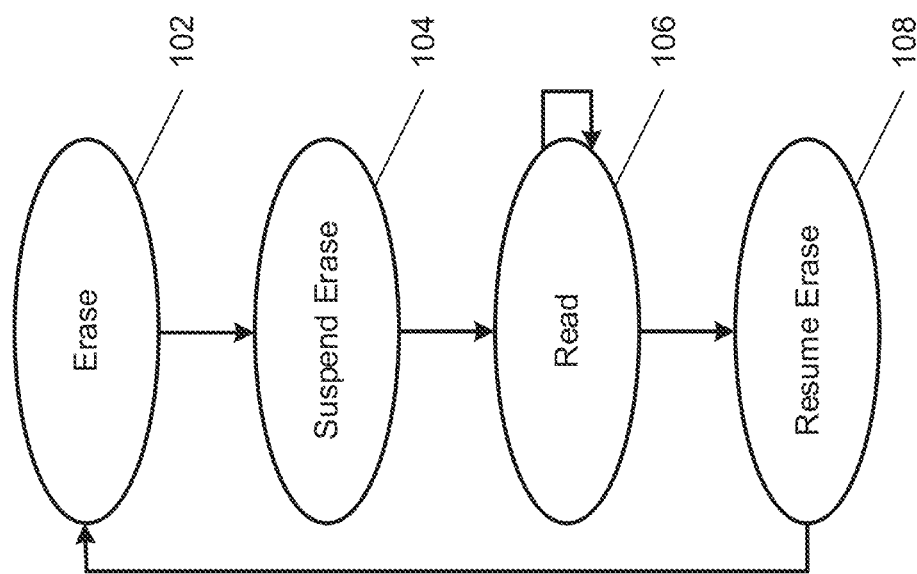
FIG. 1C illustrates a conventional hardware state machine.

According to aspects of the present disclosure, the plurality of control registers are associated with a plurality of application specific engines, namely ASE a, ASE b, ASE c, through ASE n (labelled as 208a, 208b, 208c through 208n). The plurality of application specific engines may be generic CPUs, and when such generic CPUs along with their corresponding control registers can be configured to perform certain function of a state machine. For example, ASE a 208a and control register a 202a can be configured to perform the function of a state in the programmable state machine 200, such as the state of erase 102 as in FIG. 1A or FIG. 1C.

In some other implementations, the plurality of application specific engines may be implemented with application specific integrated circuits and each control register in the plurality of control registers may be included in the corresponding ASE. For example, the control register a 202a may be included in the application specific implementation of ASE a 208a. Similarly, with this implementation, the combination of ASE a 208a and control register a 202a can be configured to perform the function of a state in the programmable state machine 200, such as the state of suspend erase 104 as in FIG. 1A or FIG. 1C.

The set of task engines (204a through 204L) and the arbitrator 206 are configured to assist the plurality of application specific engines (208a through 208n) to access or modify the application resources, based on the priority of the plurality of application specific engines (208a through 208n) and the availability of the application resources 210. In some implementations, the number of task engines (204a through 204L) may be less than the number of application specific engines (202a through 202n) to conserve hardware resources. Each task engine in the set of task engines (204a through 204L) can be configured to setup an application specific engine to access or modify an application resource. For example, a task engine can be configured to perform at least one of the functions of request an application resource, access/modify on the application resource, and release the application resource after completion of the access or operation. The task engine can further be configured to perform at least one of the functions of initialization, push, pop, or status inquiry with respect to the application resources. The arbitrator 206 may be configured to arbitrate the set of task engines (204a through 204L) based on priorities of the corresponding application resources being requested. The arbitrator 206 may further be configured to arbitrate the set of task engines (204a through 204L) based on an indication of percentage of usage of the application resources 210.

According to aspects of the present disclosure, the application resources 210 may include a plurality of application data (not shown) in the form of data arrays that provide indices to the application data. In some applications, the application resources may include a plurality of hardware components or subcomponents (labelled as 210a, 210b, 210c through 210z). The application resources 210 may further include shared notification registers 211 configured to provide statuses of the plurality of application data or to provide statuses of the plurality of hardware components (210a, 210b, 210c through 210z).

Figure 2B:
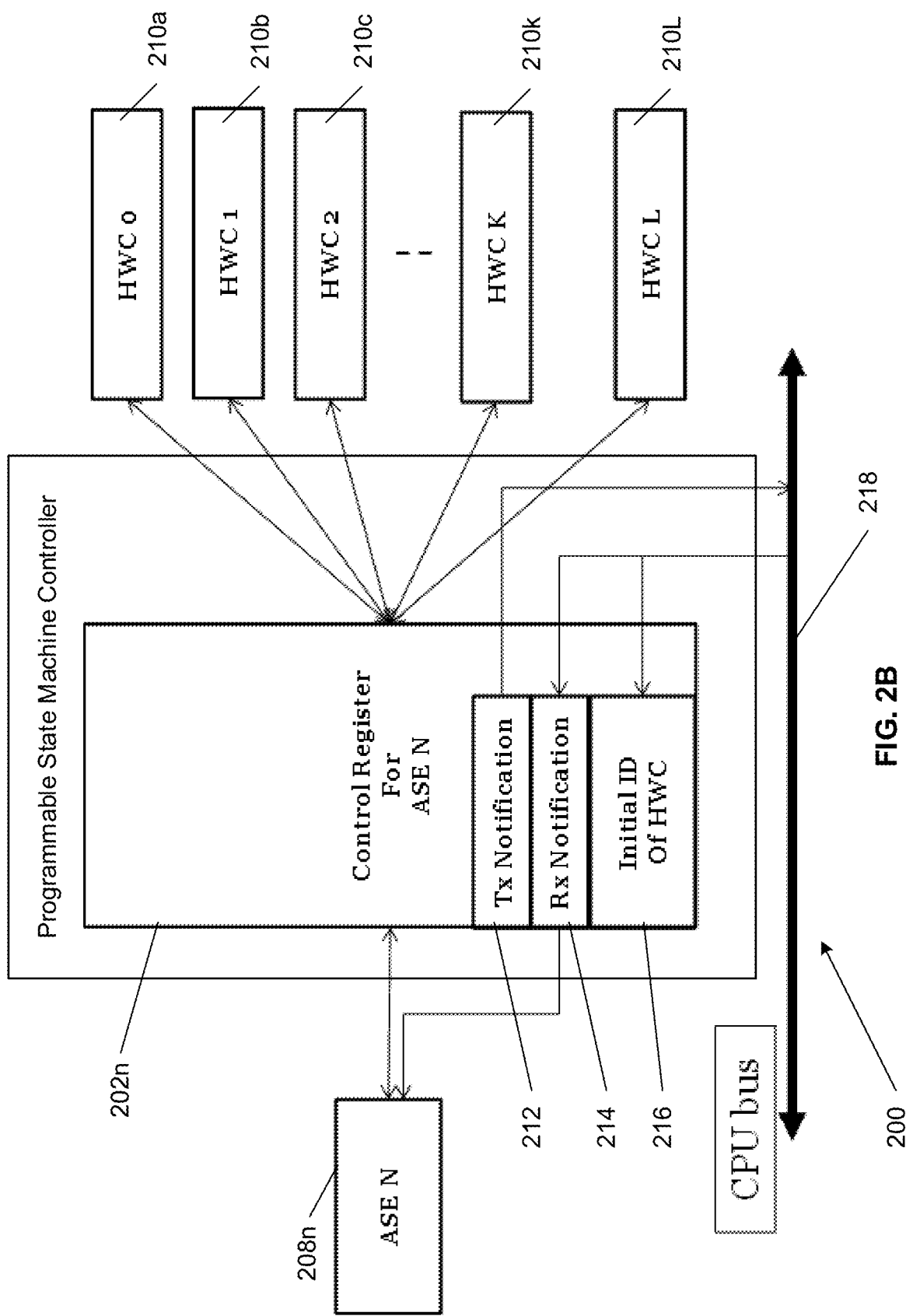
FIG. 2B illustrates an exemplary control register of a programmable state machine controller of FIG. 2A according to aspects of the present disclosure.

FIG. 2B illustrates an exemplary control register of a programmable state machine controller of FIG. 2A according to aspects of the present disclosure. Note that for simplicity, the task engines and the arbitrator are not shown in FIG. 2B. In the example shown in FIG. 2B, control register N 202n may be configured to serve an application specific engine N (ASE N labeled as 208n). The control register for ASE N may include registers for transmit notification 212, receive notification 214, and initial identifier of a hardware component 216 or data array (not shown) in the plurality of application resources. The registers of the control register may be programmed using a CPU bus 218. As shown in this example, the control register 202n for ASE N 208n enables the ASE N 208n to access or modify any one of the application resources, shown as HWC 0, HWC 1, HWC 2, through HWC L (labelled as 210a, 210b, 210c, 210k, and 210L). In other implementations, the application resources may be data arrays that provide indices to the data contents for ASE N 208n.

Figure 2C:
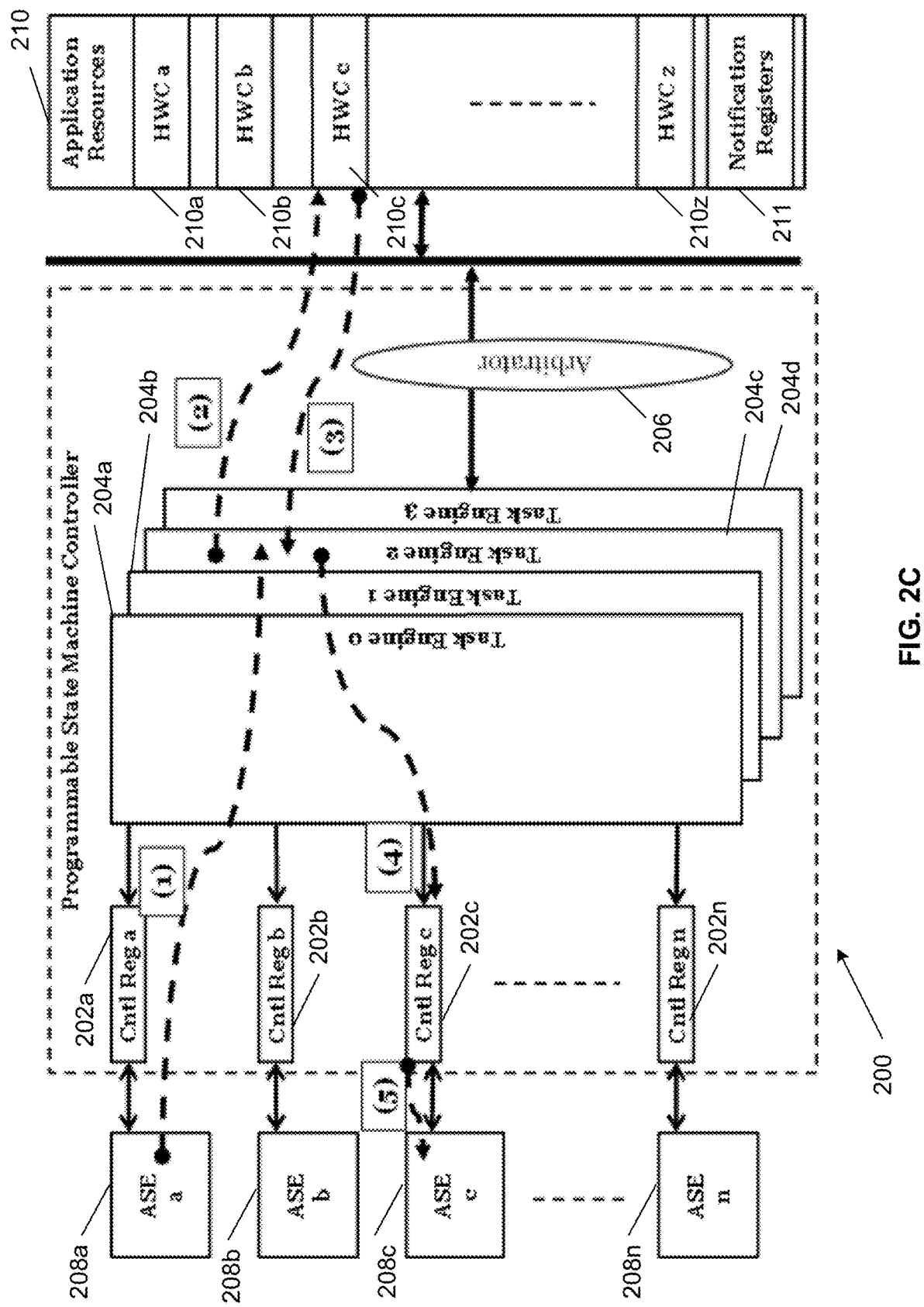
FIG. 2C illustrates an exemplary control flow of the programmable state machine controller of FIG. 2A according to aspects of the present disclosure.

FIG. 2C illustrates an exemplary control flow of the programmable state machine controller of FIG. 2A according to aspects of the present disclosure. Note that the components illustrated in FIG. 2C is the same as in FIG. 2a, and the descriptions of these components are the same as in FIG. 2A and are skipped herein for simplicity. In the exemplary application scenario of FIG. 2C, in step (1), application specific engine a (ASE a labelled as 208a) makes a request to modify hardware component c (HWC c, labelled as 210c) in the plurality of application resources, and control register a (Cntl Reg a labelled as 202a) is configured to serve this transaction by ASE a 208a. Based on the priority of the other requests from the application specific engines and the availability of the task engines (labelled as 204a, 204b, 204c, and 204d in this example), task engine 2 (204c) is assigned to handle this transaction. In step (2), based on the outcome of arbitration by the arbitrator 206, task engine 2 (204c) performs the transaction to modify HWC c (210c). In step (3), application specific engine c (ASE c labelled as 208c) makes a request to access HWC c (210c) in the plurality of application resources 210, and control register c (Cntl Reg c, labelled as 202c) is configured to serve this transaction by ASE c (208c). Based on the priority of the other requests from the application specific engines (208a through 208n) and the availability of the task engines (204a through 204d), task engine 2 (204c) is again assigned to handle this transaction. In step (4) and step (5), task engine 2 (204c) performs the transaction using the control register c (202c), and provides the information received from HWC c (210c) to the application specific engine c (ASE c labelled as 208c).

Note that one of the benefits of the system shown in FIG. 2A-FIG. 2C is that such transactions are performed without software interrupts or inter-processor communications. As a result, the performance of the system can be improved. In addition, different task engines can be configured to serve different transactions between the application specific engines and the application resources, thus enabling processing of the different transactions in parallel when there is no contention in accessing the same application resources. In some implementations, when there is contention in accessing the same application resources, the programmable state machine controller may arbitration such transaction based on the priority of the transactions, allowing the higher priority transaction to be served, and putting the lower priority transaction on hold until the application resource is available and there is task engine available to serve the lower priority transaction. In some other implementation, a FIFO may optionally or additionally be employed to store the lower priority transactions. These lower priority transactions may be services based on the order they are received.

In addition, another benefit of the system shown in FIG. 2A-FIG. 2C is that each application specific engine (ASE) may be configured to perform a specific function, such as the function of a state in a state machine, at runtime, therefore, the system can allow a new state to be added to an existing state machine, or can skip a state in the existing state machine. Both of these capabilities can be useful in modifying the functions of an existing state machine or debugging the functions of the existing state machine, which would not be available in a conventional hardwired hardware state machine design.

Figure 3:
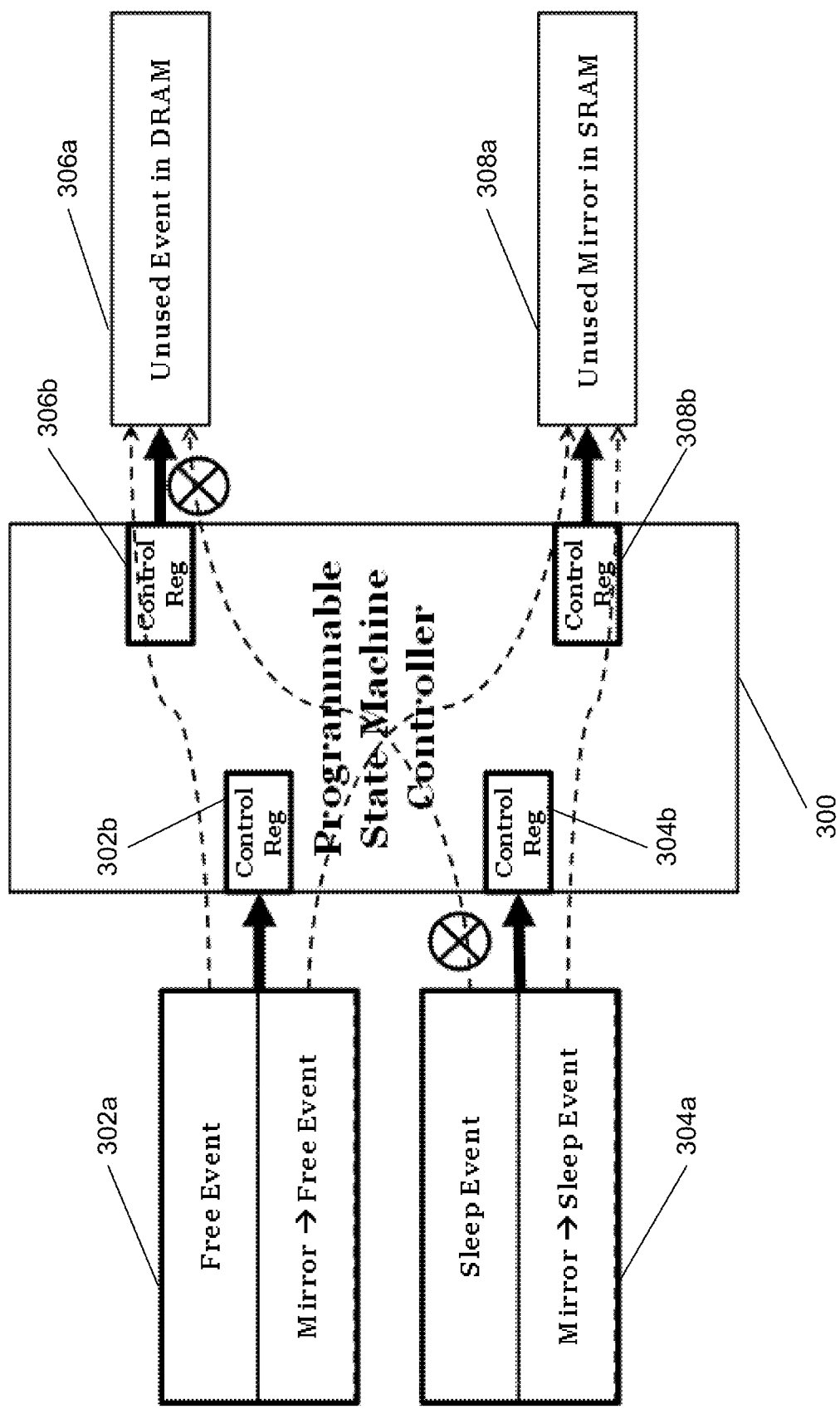
FIG. 3 illustrates an exemplary application of a programmable state machine controller in a parallel processing system according to aspects of the present disclosure.

FIG. 3 illustrates an exemplary application of a programmable state machine controller in a parallel processing system according to aspects of the present disclosure. Note that the components of the programmable state machine controller are substantially similar to those shown in FIG. 2a, and the descriptions of these components are skipped herein for simplicity. In the exemplary application shown in FIG. 3, the programmable state machine 300 is configured to support a state machine having four states, namely, free event 302a, sleep event 304a, unused event in DRAM 306a, and unused event in SRAM 308a. Each state of the state machine is supported by a corresponding control register (302b, 304b, 306b, and 308b). For the free event state 302a, the function to be performed is to mirror a free event, which includes clear information with respect to the free event in SRAM as indicated by the dotted line from the free event state to the unused mirror in SRAM state (i.e. in cache), and clear information with respect to the free event in DRAM as indicated by the dotted line from the free event state to the unused event in DRAM state. For the sleep event state 304a, the function to be performed is to mirror a sleep event, which includes clear information with respect to the free event in SRAM as indicated by the dotted line from the sleep event state to the unused mirror in SRAM state (i.e. in cache), and save the information with respect to the sleep event in DRAM as indicated by crosses on the dotted line from the sleep event state to the unused event in DRAM state. Note that the functions of the free event state 302a, sleep event state 304a, unused mirror in SRAM state 306a, and unused event in DRAM state 308a can be performed without software interrupts or inter-processor communications. As a result, the performance of the system can be improved.

According to aspects of the present disclosure, each of the free event state 302a, sleep event state 304a, unused mirror in SRAM state 306a, and unused event in DRAM state 308a may be implemented with an application specific engine (ASE) with its associated control register. As shown in FIG. 3, one state may call upon another state to perform a part of the functions of the state. In other words, an ASE may call upon another ASE to perform a part of the functions of the ASE. Upon configuring the control registers and based on the priority of the states and the availability of the application resources, the four ASEs may performs its functions in parallel, which in turn can improve the performance of the system.

Figure 4:
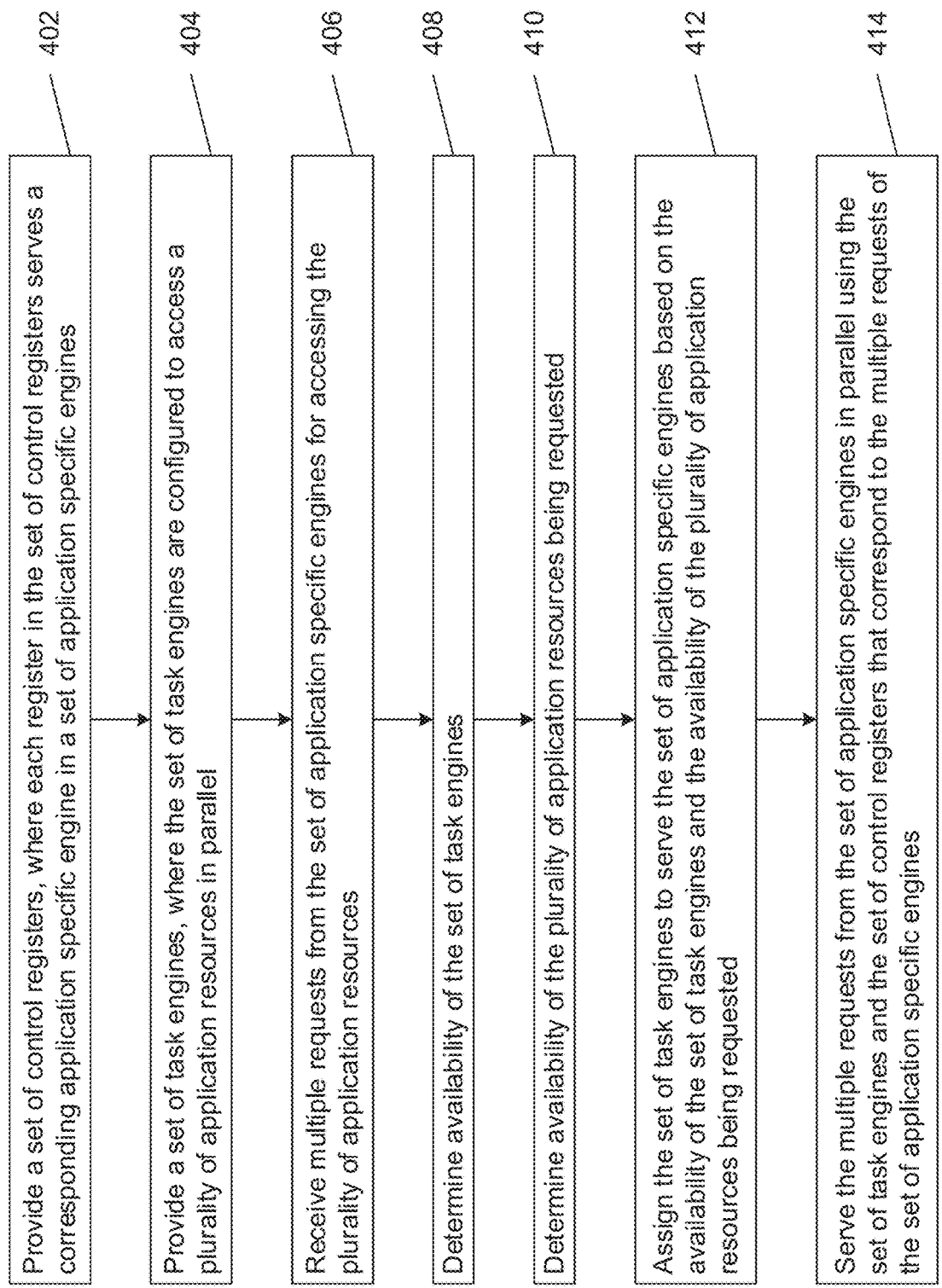
FIG. 4 illustrates an exemplary implementation of a programmable state machine controller in a parallel processing system according to aspects of the present disclosure.

FIG. 4 illustrates an exemplary implementation of a programmable state machine controller in a parallel processing system according to aspects of the present disclosure. As shown in FIG. 4, in block 402, the method provides a set of control registers, wherein each register in the set of control registers serves a corresponding application specific engine in a set of application specific engines. In block 404, the method provides a set of task engines, wherein the set of task engines are configured to access a plurality of application resources in parallel. In block 406, the method receives multiple requests from the set of application specific engines for accessing the plurality of application resources. In block 408, the method determines availability of the set of task engines. In block 410, the method determines availability of the plurality of application resources being requested. In block 412, the method assigns the set of task engines to serve the set of application specific engines based on the availability of the set of task engines and the availability of the plurality of application resources being requested. In block 414, the method serves the multiple requests from the set of application specific engines in parallel using the set of task engines and the set of control registers that correspond to the multiple requests of the set of application specific engines.

According to aspects of the present disclosure, an application specific engine includes a processor. Optionally or additionally, an application specific engine may include an application specific integrated circuits. The plurality of application resources may include a plurality of data arrays, where each of the data array in the plurality of data array may include indices pointing to information associated with an application resource. Optionally or additionally, the plurality of application resources may include a plurality of hardware components, where each hardware component in the plurality of hardware components is configured to perform a specific function. The each register in the set of control registers may include at least one of: 1) an identifier of an application resource to be accessed; 2) a starting address of the application resource to be accessed; 3) a write address; 4) a read address; 5) a lock indicator configured to indicate whether the application specific engine is being served; or 6) some combination thereof.

According to aspects of the present disclosure, determine the availability of the set of task engines may include arbitrate the set of task engines based on priorities of the corresponding application specific engines being served by the set of task engines. Determine the availability of the plurality of application resources being requested may include at least one of: 1) access shared notification registers of the plurality of application resources to obtain availability of the plurality of application resources; 2) arbitrate the set of task engines based on priorities of the corresponding application resources being requested; 3) arbitrate the set of task engines based on an indication of percentage of usage of the plurality of application resources; 4) read the shared notification registers of the plurality of application resources to obtain statuses of the plurality of application resources; or 5) some combination thereof. The method of programmable state machine controller may further include set the shared notification registers of an application resource upon completion of accessing the application resource.

Figure 5:
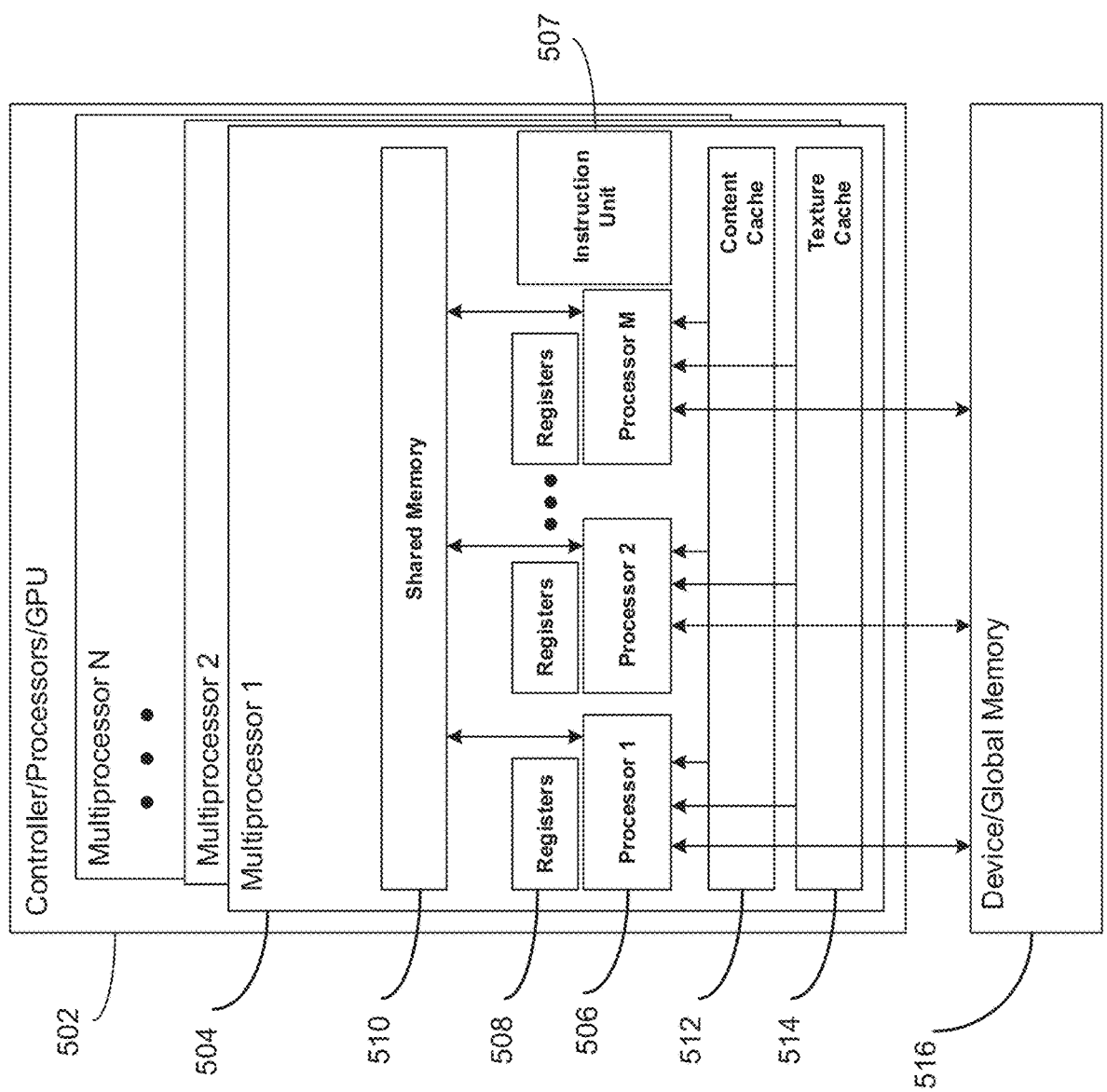
FIG. 5 illustrates an exemplary programmable state machine controller according to aspects of the present disclosure.

According to aspects of the present disclosure, one or more central processing units (CPUs) or graphic processing units (GPUs) may be configured to perform the functions of data flow control in a parallel processing system. FIG. 5 illustrates one or more processors that can be configured to perform the functions of data flow control and state machine control in a parallel processing system according to aspects of the present disclosure. As shown in FIG. 5, each controller 502 includes N multiprocessors. Each multiprocessor 504 further includes M processors 506 and an instruction unit 507. Each processor has its own registers 508. All the processors 506 in one multiprocessor 504 share a block of shared memory 510. All the processors share the same set of constant cache 512 and texture cache 514 memories. They can also access the data in device memory 516, which is also referred to as the global memory.

In this example, each multiprocessor 504 has a block of shared memory. Accessing data from the shared memory 510 is much faster than accessing data from the device (global) memory 516. For this reason, one approach to increase computational efficiency is to load the data from the global memory 516 to the shared memory 510, perform much of the computations/manipulations using the shared memory 510, and then write back the results from the shared memory 510 to the global memory 516.

Controller 502 may include a plurality of multiprocessors, such as multiprocessor 1 through multiprocessor N. In this example, each of processor may be configured to execute tasks. The tasks may be of different types, and, in some examples, each respective type of task may be stored in or associated with a respective task queue while waiting for execution by a processor. The different types of tasks may include, for example, front end tasks, which may include receiving and interpreting instructions received from host device 4. Other types of tasks including caching; back-end tasks, which may include reading data from or writing data to NVM 10; housing-keeping, which may include garbage collection, wear leveling, TRIM, or the like; and system tasks. In some examples, each processor may be referred to as a compute unit, a processing unit, a core, or a central processing unit (CPU).

In accordance with examples of this disclosure, a first processor 506 may be configured to operate as a scheduler that schedules tasks for execution by at least one other processor. First processor 506 may assign tasks from a plurality of task queues to at least one other processor. As described above, each of the task queues may be associated with a task type.

In contrast to some other scheduling techniques, each task queue is associated with a respective priority ratio, and the priority ratio defines the frequency with which tasks from the respective task queue are scheduled by first processor 506 to be executed by the at least one processor. The respective priority ratio for each task queue may be based at least in part on the number of tasks in the respective task queue. In this way, the respective priority ratios are reflective of a number of tasks in the respective task queues, and the frequency with which tasks from a task queue are assigned by first processor 506 for execution is based at least in part on the number of tasks in the task queue.

In some examples, the respective priority ratios may be updated from time to time, such that the respective priority ratios are reflective of a current or recent number of tasks in the respective task queues. In this way, the techniques described herein may facilitate auto prioritization of the respective task queues based at least in part on the number of tasks currently or recently in the task queue.

For example, first processor 506 may determine the respective priority ratio associated with each task queue based at least in part on a number of tasks in the respective task queue. In some examples, first processor 506 additionally may base the priority ratio on a type of task associated with the respective task queue. For example, front-end tasks may have a higher priority than house-keeping tasks or system tasks. The priority ratio may define a relative frequency with which first processor 506 assigns task from the respective task queues to the at least one other processor. First processor 506 may update the respective priority ratio from time to time to adjust for the number of tasks in the respective task queue.

In some examples, first processor 506 may assign tasks from the respective task queues to the at least one other processor by progressing through tasks associated with the respective task queues in a predetermined order in which the task queues are interleaved. First processor 506 may determines whether to send a task from a respective task queue to be executed by at least one other processor based on the priority ratio of the respective task queue, which may be a ratio of execute indicators to skip indicators. In this way, when the priority ratio associated with a respective task queue is higher, first processor 506 assigns tasks from the respective task queue to the at least one other processor more often than when the priority ratio associated with the respective task queue is lower. Further, assuming the priority ratio is greater than zero, first processor 506 continues to assign tasks from each respective task queue to the at least one other processor.

Figure 6:
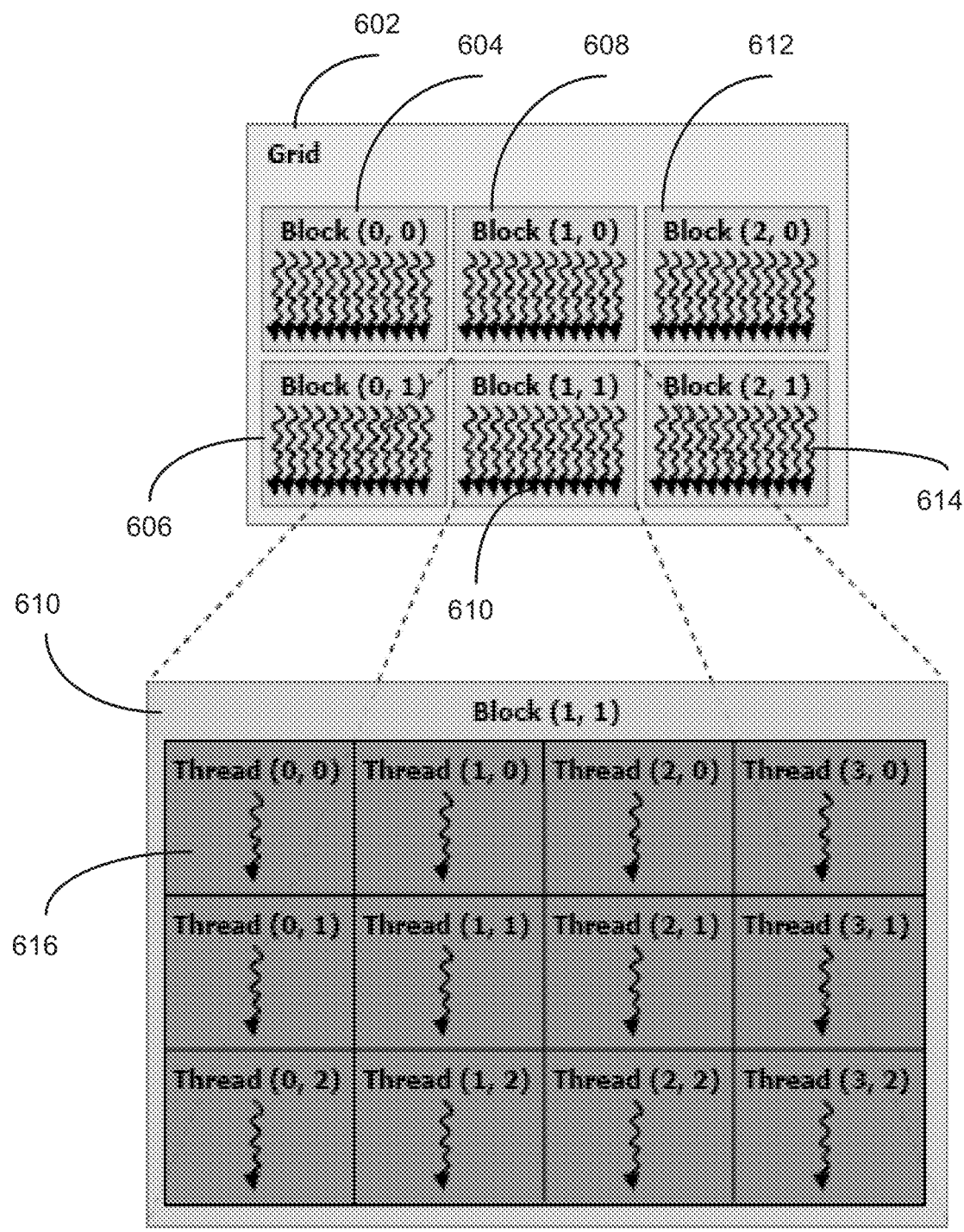
FIG. 6 illustrates an exemplary arrangement of threads in a programmable state machine controller according to aspects of the present disclosure.
Figure 7:
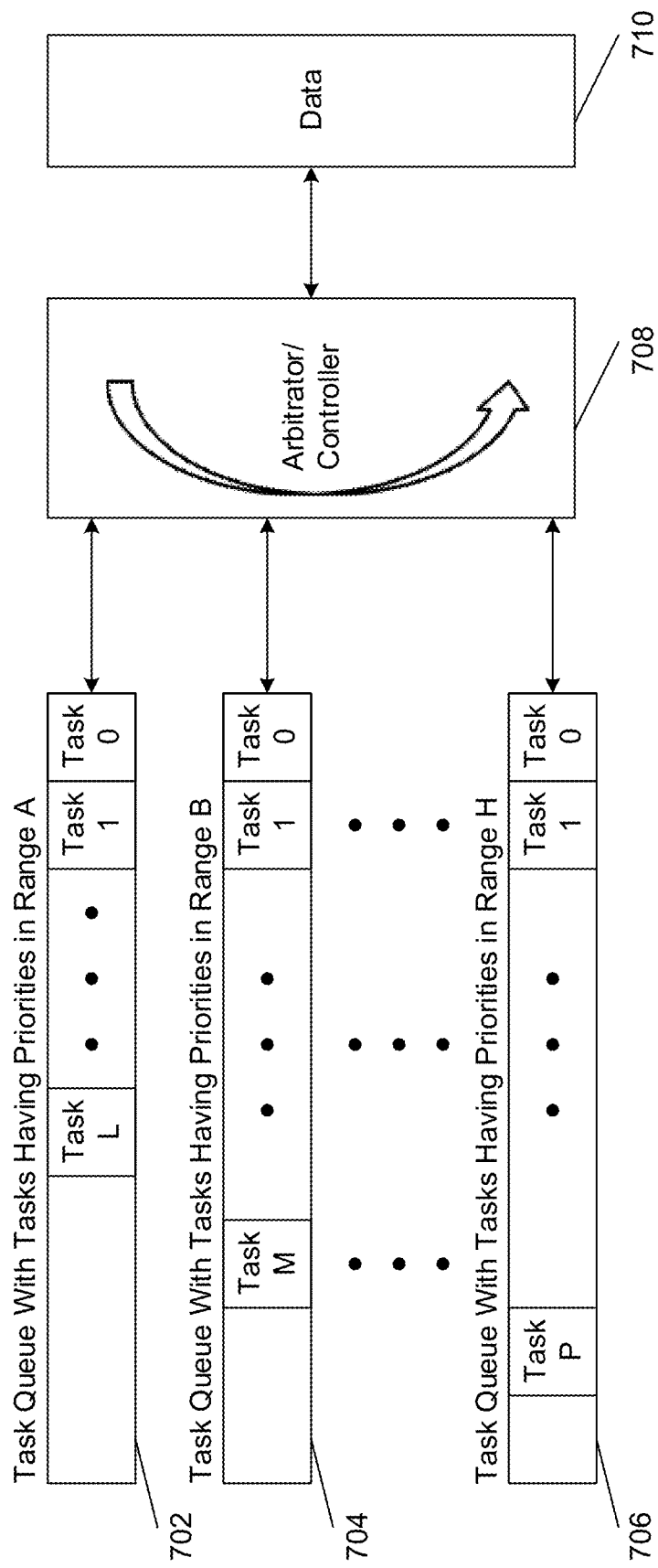
FIG. 7 illustrates a conventional arbitration scheme in a parallel processing system.

FIG. 6 illustrates an exemplary arrangement of threads in a programmable state machine controller according to aspects of the present disclosure. In this example, threads are arranged in a grid 602, and they are divided into blocks of threads, for example block (0,0) 604, block (0,1) 606, block (1,0) 608, block (1,1) 610, block (2,0) 612, and block (2,2) 614. Each block of threads (for example block (1,1) 610, is assigned to one multiprocessor and threads within one block, for example thread (0,0) 616, can communicate with each other using the shared memory as described in association with FIG. 5.

Figure 8A:
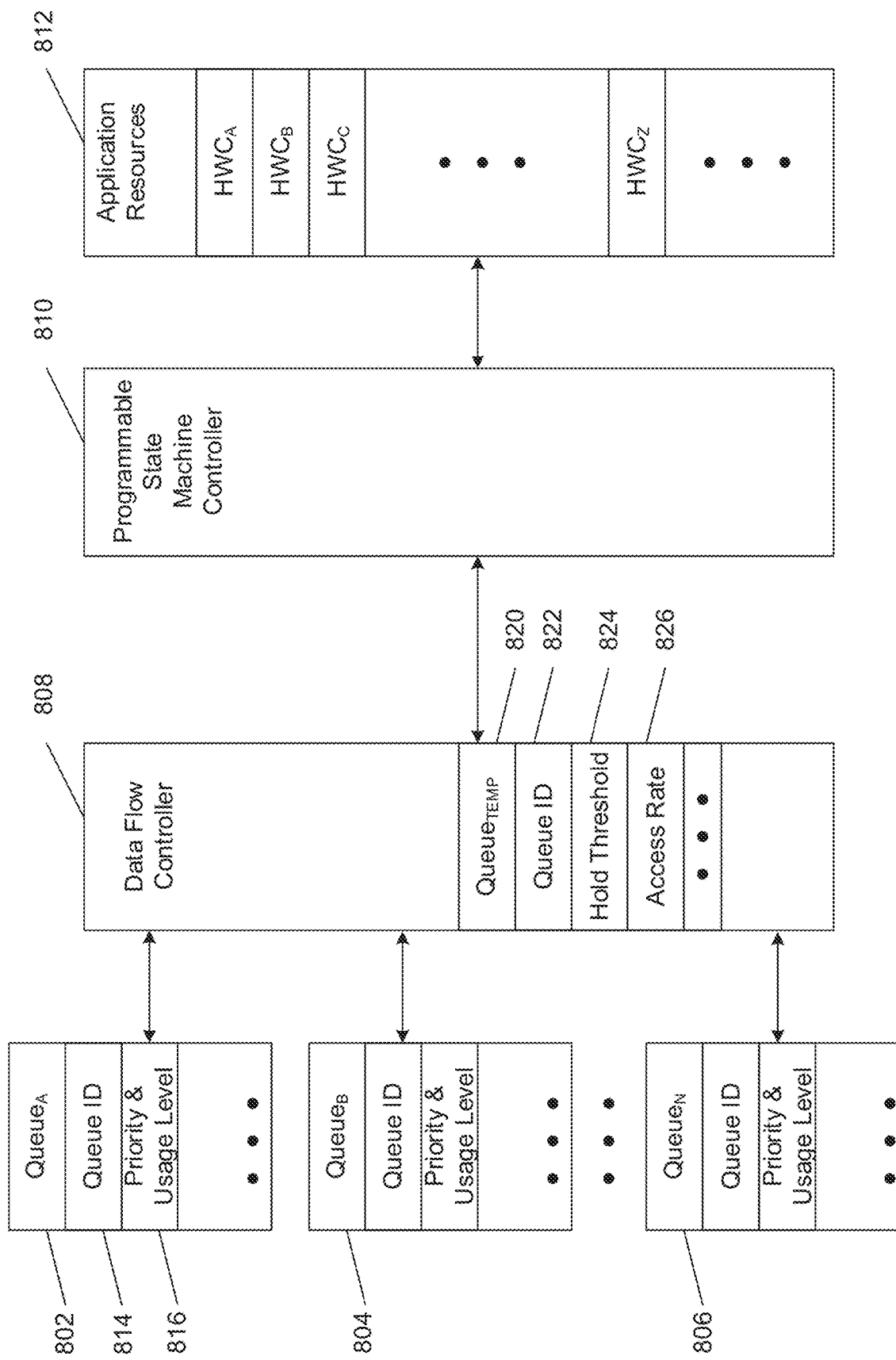
FIG. 8A illustrates an exemplary implementation of data flow control in a parallel processing system according to aspects of the present disclosure.

FIG. 8A illustrates an exemplary implementation of data flow control in a parallel processing system according to aspects of the present disclosure. In the example shown in FIG. 8A, the parallel processing system includes a plurality of task queues labeled as 802, 804, to 806. The parallel processing system may further include a data flow controller 808, a programmable state machine controller 810, and application resources 812.

Each task queue may include a Queue ID 814, and information of priority and usage level 816. Each task queue may be configured to store tasks having priorities in certain priority range. For example, $Queue_A$ 802 may include tasks having priorities in range A; $Queue_B$ 804 may include tasks having priorities in range B; and $Queue_N$ 806 may include tasks having priorities in range N.

The data flow controller 808 may include storage for header information of a temporary queue 820 selected by the data flow controller 808 for service. In one implementation, the header information for the temporary queue 820 may include a Queue ID 822, a hold threshold 824, and an access rate 826. The data flow controller 808 and its operations are further described below in association with FIGS. 9A-9B, FIGS. 10A-10B, FIGS. 11A-11B, and FIG. 12. The programmable state machine controller 810 and its operations are described above in association with FIGS. 2A-2C to FIG. 6. The application resources 812 may include a plurality of data arrays (not shown), where each of the data array in the plurality of data array may include indices pointing to information associated with an application resource. Optionally or additionally, the plurality of application resources may include a plurality of hardware components, such as $HWC_A$, $HWC_B$, $HWC_C$ through $HWC_Z$, where each hardware component in the plurality of hardware components is configured to perform a specific function.

Figure 8B:
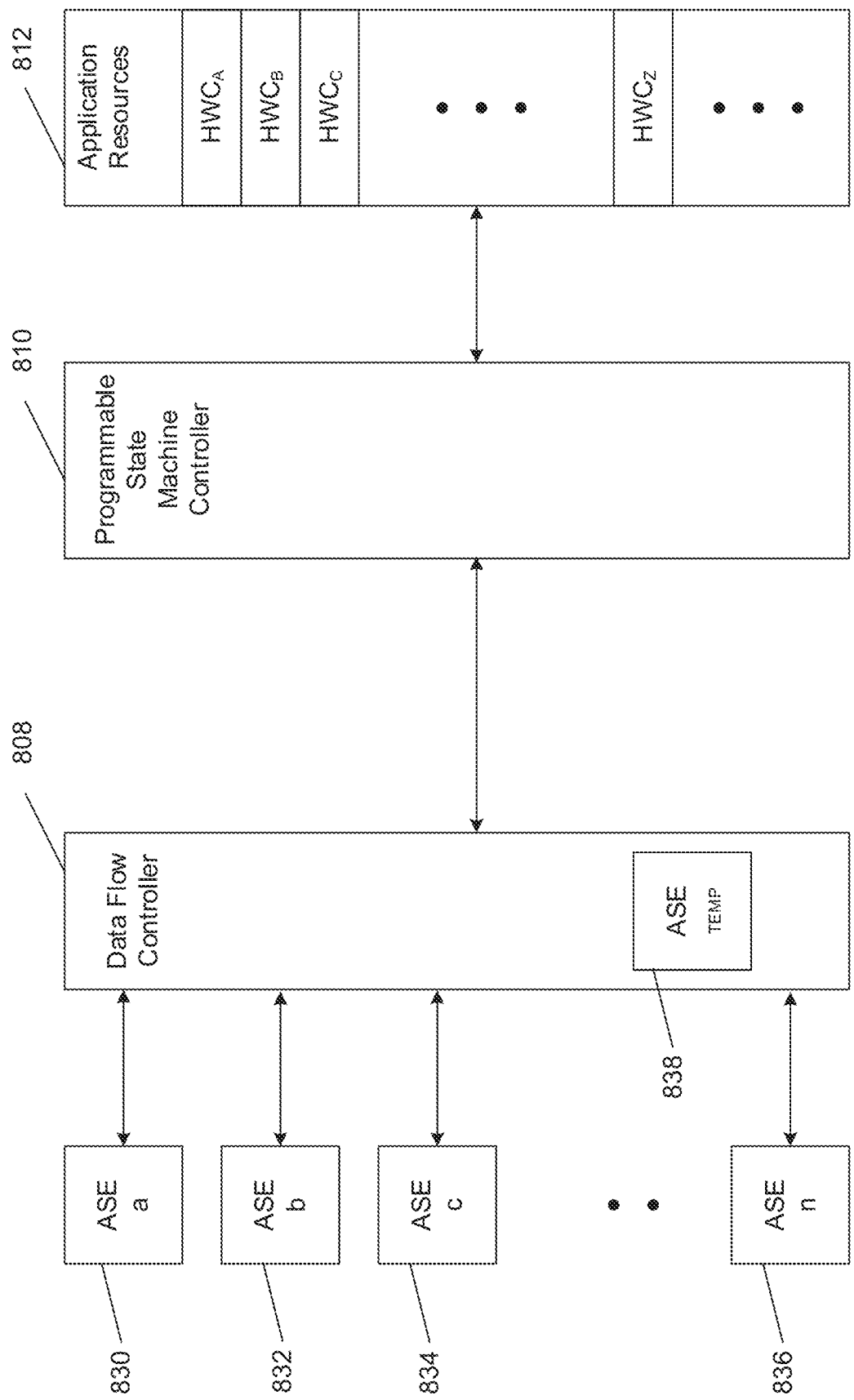
FIG. 8B illustrates another exemplary implementation of data flow control in a parallel processing system according to aspects of the present disclosure.

FIG. 8B illustrates another exemplary implementation of data flow control in a parallel processing system according to aspects of the present disclosure. In the example shown in FIG. 8B, the parallel processing system includes a plurality of application specific engines (ASE) labeled as 830, 832, 834, to 836. In this implementation, each ASE may include one or more tasks to be serviced.

Similar to the parallel processing system of FIG. 8A, the parallel processing system may further include a data flow controller 808, a programmable state machine controller 810, and application resources 812. The data flow controller 808 may include storage for header information of an application specific engine (labeled as $ASE_{TEMP}$ 838) selected by the data flow controller 808 for service. Descriptions of the data flow controller 808, the programmable state machine controller 810, and the application resources 812 are substantially similar to the descriptions of the corresponding components in FIG. 8A.

FIG. 9A illustrates an exemplary representation of dynamic access rate according to aspects of the present disclosure. In this exemplary implementation, the rows represent a plurality of task queues (in the case of FIG. 8A) or a plurality of ASEs (in the case of FIG. 8B) that having corresponding dynamic access rates as shown in FIG. 9A. In this example, 8 bits, namely bit 0 to bit 7, are used to represent the ranges of the dynamic access rate. For example, the dynamic access rate of 0% is represented by zeros in all 8 bits; a dynamic access rate range of 37.6%-50% is represented by the bit pattern 00001111; and a dynamic access rate range of 87.6%-100% is represented by the bit pattern 11111111. Note that different dynamic access rate ranges, as opposed to an increment of 12.5%, may be used in other implementations; and different number of bits, such as 16 bits or 32 bits, as opposed to 8 bits, may be used to represent the dynamic access rate.

FIG. 9B illustrates an exemplary implementation of shuffling bits representing a dynamic access rate according to aspects of the present disclosure. In the example shown in FIG. 9B, the representation of the dynamic access rate is the same as in the representation of FIG. 9A, except the order of the bit pattern has been shuffled. In other words, the dynamic access rate of 0% is still represented by zeros in all 8 bits; a dynamic access rate range of 37.6%-50% is still represented by the bit pattern having four zeros and four ones with a shuffled bit pattern of 01010101; and a dynamic access rate range of 87.6%-100% is still represented by the bit pattern 11111111.

According to aspects of the present disclosure, by shuffling the bits representing the dynamic access rate, the plurality of task queues (in the example of FIG. 8A) or the plurality of ASEs (in the example of FIG. 8B) can be served in an evenly distributed manner. For example, the bit pattern representing the dynamic access rate range of 37.6%-50% prior to shuffling is 00001111. In this case, the task queue (or ASE) would be served four cycles in a row and then would be skipped service for four cycles in a row; this could lead to uneven load distribution. With shuffling, the same dynamic access rate range of 37.6%-50% is represented by bit pattern 01010101. Without changing the dynamic access rate, the corresponding task queue/ASE is served every other cycle, this improves the load distribution of the parallel processing system.

Figure 10A:
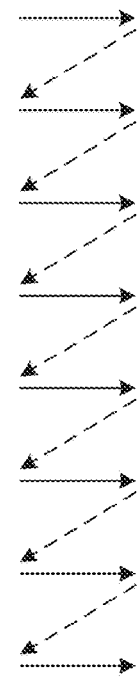
FIG. 10 A illustrates an exemplary implementation of traversing a plurality of task queues with corresponding dynamic access rates according to aspects of the present disclosure.

FIG. 10A illustrates an exemplary implementation of traversing a plurality of task queues with corresponding dynamic access rates according to aspects of the present disclosure. Note that the representation of the dynamic access rate shown in FIG. 10A is similar to the representation of the dynamic access rate shown in FIG. 9B, the detailed description of dynamic access rate ranges and shuffling of bit patterns are not repeated here for simplicity.

In the exemplary implementation shown in FIG. 10A, based on the dynamic access rate ranges presented and the shuffled bit patterns, the method may traverse each column and determines whether to serve a task queue corresponding to the given dynamic access rate range. In one implementation, the method may traverse the right most column (represented by bit 0) and determines whether a task queue (or ASE) would be served based on the bit pattern corresponding to each task queue (or ASE). In this example, a 0 represents the task queue will be skipped for service and a 1 represents the task queue will be served. Upon finish traversing the right most column, the method moves to the next column (represented by bit 7) and determines whether a task queue would be served based on the bit pattern corresponding to each task queue. The process repeats until the left most column (represented by bit 4) is traversed. Upon finish traversing the left most column, the process may be repeated from the right most column again.

Note that although the above method describe a process that traverses from up to down and left to right, variations of the process may be implemented. For example, the process may traverse in a down to up and right to left manner, or other methods of traversing FIG. 10A.

Figure 10B:
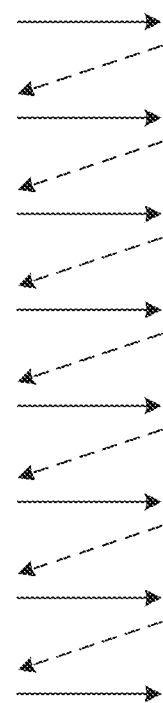

FIG. 10B illustrates an exemplary implementation of traversing a plurality of task queues with corresponding dynamic access rates according to aspects of the present disclosure. In this exemplary implementation, the rows represent a plurality of task queues (in the case of FIG. 8A) or a plurality of ASEs (in the case of FIG. 8B) that having corresponding dynamic access rates as shown in FIG. 10B. In this example, 8 bits, namely bit 0 to bit 7, are used to represent the ranges of the dynamic access rate and five different ranges of dynamic access rates are shown. For example, the dynamic access rate of 0% is represented by zeros in all 8 bits; a dynamic access rate range of 25.1%-50% is represented by the bit pattern 01010101; and a dynamic access rate range of 75.1%-100% is represented by the bit pattern 11111111.

In this example, based on the dynamic access rate ranges presented and the shuffled bit patterns, the method may traverse each column and determines whether to serve a task queue corresponding to the given dynamic access rate range. In one implementation, the method may traverse the right most column (represented by bit 0) and determines whether a task queue (or ASE) would be served based on the bit pattern corresponding to each task queue (or ASE). In this example, a 0 represents the task queue will be skipped for service and a 1 represents the task queue will be served. Upon finish traversing the right most column, the method moves to the next column (represented by bit 7) and determines whether a task queue would be served based on the bit pattern corresponding to each task queue. The process repeats until the left most column (represented by bit 4) is traversed. Upon finish traversing the left most column, the process may be repeated from the right most column again.

FIG. 11A illustrates an exemplary implementation of modifying a dynamic access rate according to aspects of the present disclosure. To increase the dynamic access rate, the bit pattern may be up-shifted by one or more bits. For example, to increase the dynamic access rate from the range of 25.1%-37.5% to the range of 37.6%-50%, the bit pattern representing the dynamic access rate is shifted to the left by one bit, indicated by the three dashed arrows; and a 1 is appended to the least significant bit 1102, indicated by the solid arrow. Note that the most significant bit is shifted out.

FIG. 11B illustrates another exemplary implementation of modifying a dynamic access rate according to aspects of the present disclosure. In this example, to increase the dynamic access rate from the range of 25.1%-37.5% to the range of 50.1%-62.5%, the bit pattern representing the dynamic access rate is shifted to the left by two bits, indicated by the three dashed arrows; and the lower two bits are appended with ones, indicated by the solid arrows (1104 and 1106). Note that the most significant two bits are shifted out.

Figure 11C:
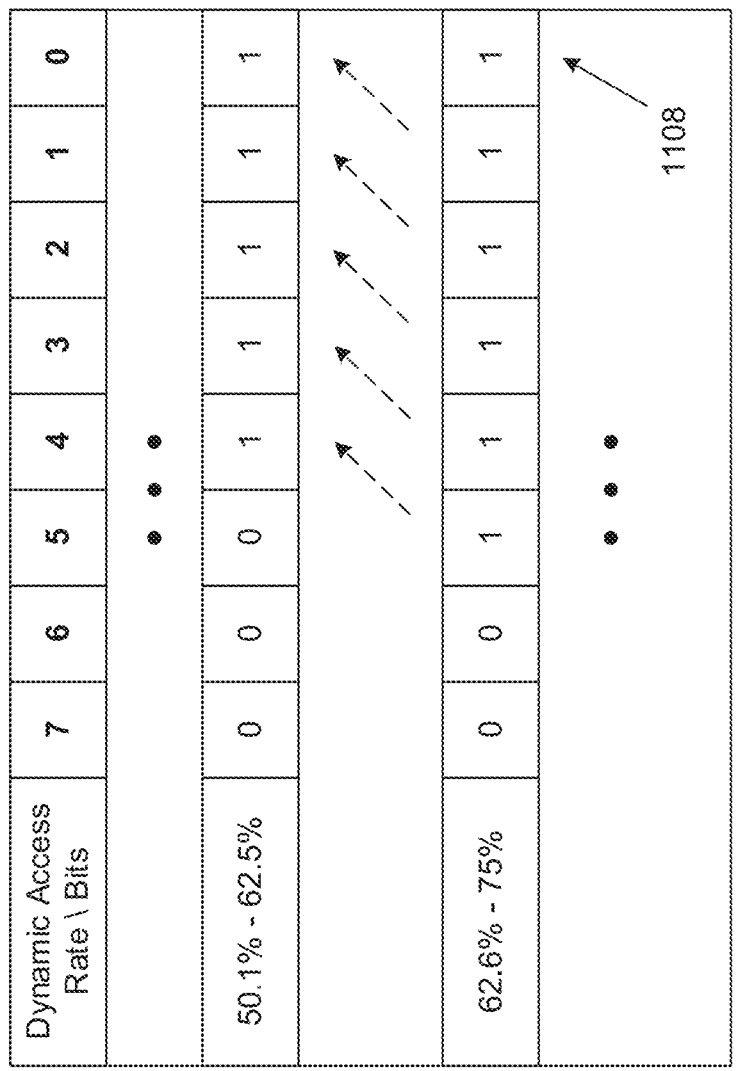
FIG. 11C illustrates yet another exemplary implementation of modifying a dynamic access rate according to aspects of the present disclosure.

FIG. 11C illustrates yet another exemplary implementation of modifying a dynamic access rate according to aspects of the present disclosure. To decrease the dynamic access rate, the bit pattern may be down-shifted by one or more bits. For example, to decrease the dynamic access rate from the range of 62.6%-75% to the range of 50.1%-62.5%, the bit pattern representing the dynamic access rate is shifted to the right by one bit, indicated by the five dashed arrows; and a 0 is appended to the most significant bit. Note that the least significant bit 1108, indicated by the solid arrow, is shifted out. In some implementations, if only the least significant bit is set in a dynamic access rate, the least significant bit will not be shifted out.

FIG. 11D illustrates yet another exemplary implementation of modifying a dynamic access rate according to aspects of the present disclosure. To decrease the dynamic access rate, one or more bits may be appended to the dynamic access rates associated with the plurality of dynamic access rate ranges to produce a proportional adjustment to the plurality of task queues or ASEs. In the example shown in FIG. 11D, 8 upper bits are appended to the dynamic access rate ranges. In this case, the dynamic access rate associated with each of the task queue or ASE has been proportionally reduced by 50%. In other implementations, different number of bits may be appended to the upper bits to produce different percentage of adjustment to the dynamic access rate associated with each of the task queue or ASE. In yet other implementations, one or more bits may be appended to lower bits of the dynamic access rate ranges (not shown in FIG. 11D) to proportionally increase the dynamic access rate associated with each of the task queue or ASE. Note that comparing to the method described in FIG. 11C, the example shown in FIG. 11 D not only accomplishes the objective of decreasing the dynamic access rate, it also increases the resolution of the dynamic access rate.

FIG. 12A illustrates a method of performing data flow control in a parallel processing system according to aspects of the present disclosure. As shown in FIG. 12A, in block 1202, the method stores tasks to be serviced in a plurality of task queues based on assigned priorities of the tasks, where a task queue in the plurality of task queue stores tasks having assigned priorities in a given priority range. In block 1204, the method determines a usage rate associated with the each task queue in the plurality of task queues. In block 1206, the method determines a dynamic access rate corresponding to the each task queue based on the assigned priority level and the usage rate associated with the each task queue in the plurality of task queues. In block 1208, the method traverses the plurality of task queues in order. In block 1210, the method selects a task queue from the plurality of task queues for service based on the dynamic access rate associated with the task queue.

FIG. 12B illustrates a method of determining a usage rate associated with a task queue according to aspects of the present disclosure. In the exemplary implementation shown in FIG. 12B, in block 1212, the method identifies a length of the task queue the each task queue. In block 1214, the method determines a location of a head task to be serviced in the each task queue. In block 1216, the method determines a location of a tail task to be serviced in the each task queue. In block 1218, the method determines a number of tasks to be serviced from the location of the head task and the location of the tail task. In block 1220, the method determines the usage rate based on a ratio of the number of tasks to be serviced and the length of the task queue.

Figure 12C:
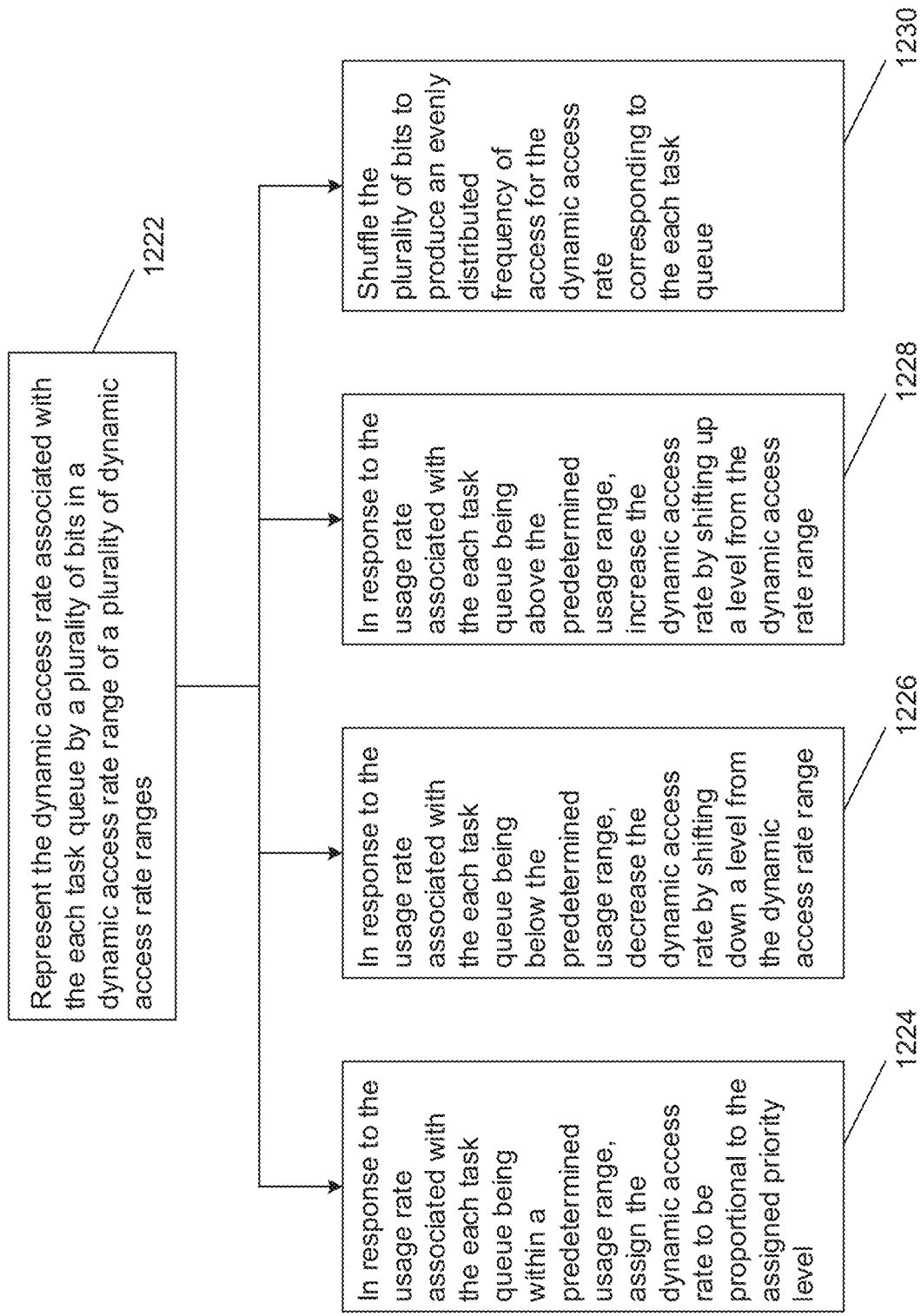
FIG. 12C illustrates methods of modifying a dynamic access rate associated with a task queue according to aspects of the present disclosure.

FIG. 12C illustrates methods of modifying a dynamic access rate associated with a task queue according to aspects of the present disclosure. In the example shown in FIG. 12C, in block 1222, the method represents the dynamic access rate associated with the each task queue by a plurality of bits in a dynamic access rate range of a plurality of dynamic access rate ranges. In block 1224, in response to the usage rate associated with the each task queue being within a predetermined usage range, the method assigns the dynamic access rate to be proportional to the assigned priority level. In block 1226, in response to the usage rate associated with the each task queue being below the predetermined usage range, the method decreases the dynamic access rate by shifting down a level from the dynamic access rate range. In block 1228, in response to the usage rate associated with the each task queue being above the predetermined usage range, the method increases the dynamic access rate by shifting up a level from the dynamic access rate range. In block 1230, the method shuffles the plurality of bits to produce an evenly distributed frequency of access for the dynamic access rate corresponding to the each task queue.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, and firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A data flow controller in a parallel processing system, comprising:
   a plurality of task queues configured to store tasks to be serviced based on assigned priorities of the tasks, wherein a task queue in the plurality of task queue stores tasks having assigned priorities in a given priority range, and wherein the plurality of task queues are implemented in a computer memory;
   one or more processors configured to:
   determine a usage rate associated with the each task queue in the plurality of task queues, comprising identify a length of the task queue the each task queue, determine a location of a head task to be serviced in the each task queue, determine a location of a tail task to be serviced in the each task queue, determine a number of tasks to be serviced from the location of the head task and the location of the tail task, and determine the usage rate based on a ratio of the number of tasks to be serviced and the length of the task queue;
   determine a dynamic access rate corresponding to the each task queue based on the assigned priority level and the usage rate associated with the each task queue in the plurality of task queues;
   traverse the plurality of task queues in order; and
   select a task queue from the plurality of task queues for service based on the dynamic access rate associated with the task queue.

2. The data flow controller of claim 1, wherein the one or more processors is further configured to:
   represent the dynamic access rate associated with the each task queue by a plurality of bits in a dynamic access rate range of a plurality of dynamic access rate ranges.

3. The data flow controller of claim 2, wherein the one or more processors is further configured to:
   in response to the usage rate associated with the each task queue being within a predetermined usage range, assign the dynamic access rate to be proportional to the assigned priority level.

4. The data flow controller of claim 2, wherein the one or more processors is further configured to:
   in response to the usage rate associated with the each task queue being below the predetermined usage range, decrease the dynamic access rate by shifting down a level from the dynamic access rate range.

5. The data flow controller of claim 2, wherein the one or more processors is further configured to:
in response to the usage rate associated with the each task queue being above the predetermined usage range, increase the dynamic access rate by shifting up a level from the dynamic access rate range.

6. The data flow controller of claim 2, wherein the one or more processors is further configured to:
shuffle the plurality of bits to produce an evenly distributed frequency of access for the dynamic access rate corresponding to the each task queue.

7. The data flow controller of claim 1, wherein the one or more processors is further configured to:
in response to one or more triggering conditions from the parallel processing system, modify the dynamic access rate associated with the each task queue.

8. The data flow controller of claim 1, wherein the one or more processors is further configured to:
retrieve a task from the task queue for service;
store associated queue identifier, dynamic access rate, and hold threshold of the task selected in a temporary memory; and
service the task using the associated queue identifier, dynamic access rate, and hold threshold of the task.

9. A method of data flow control in a parallel processing system, comprising:
storing tasks to be serviced in a plurality of task queues based on assigned priorities of the tasks, wherein a task queue in the plurality of task queue stores tasks having assigned priorities in a given priority range;
determining a usage rate associated with the each task queue in the plurality of task queues, comprising identifying a length of the task queue the each task queue, determining a location of a head task to be serviced in the each task queue, determining a location of a tail task to be serviced in the each task queue, determining a number of tasks to be serviced from the location of the head task and the location of the tail task, and determining the usage rate based on a ratio of the number of tasks to be serviced and the length of the task queue;
determining a dynamic access rate corresponding to the each task queue based on the assigned priority level and the usage rate associated with the each task queue in the plurality of task queues;

traversing the plurality of task queues in order; and
selecting a task queue from the plurality of task queues for service based on the dynamic access rate associated with the task queue.

10. The method of claim 9, further comprising:
representing the dynamic access rate associated with the each task queue by a plurality of bits in a dynamic access rate range of a plurality of dynamic access rate ranges.

11. The method of claim 10, wherein determining the dynamic access rate comprises:
in response to the usage rate associated with the each task queue being within a predetermined usage range, assigning the dynamic access rate to be proportional to the assigned priority level.

12. The method of claim 10, wherein determining the dynamic access rate further comprises:
in response to the usage rate associated with the each task queue being below the predetermined usage range, decreasing the dynamic access rate by shifting down a level from the dynamic access rate range.

13. The method of claim 10, wherein determining the dynamic access rate further comprises:
in response to the usage rate associated with the each task queue being above the predetermined usage range, increasing the dynamic access rate by shifting up a level from the dynamic access rate range.

14. The method of claim 10, further comprising:
shuffling the plurality of bits to produce an evenly distributed frequency of access for the dynamic access rate corresponding to the each task queue.

15. The method of claim 9, wherein
in response to one or more triggering conditions from the parallel processing system, modifying the dynamic access rate associated with the each task queue.

16. The method of claim 9, further comprising:
retrieving a task from the task queue for service;
storing associated queue identifier, dynamic access rate, and hold threshold of the task selected in a temporary memory; and
servicing the task using the associated queue identifier, dynamic access rate, and hold threshold of the task.

* * * * *